W. W. REYNOLDS.
PLATFORM SCALE.
No. 67,908. Patented Aug. 20, 1867.
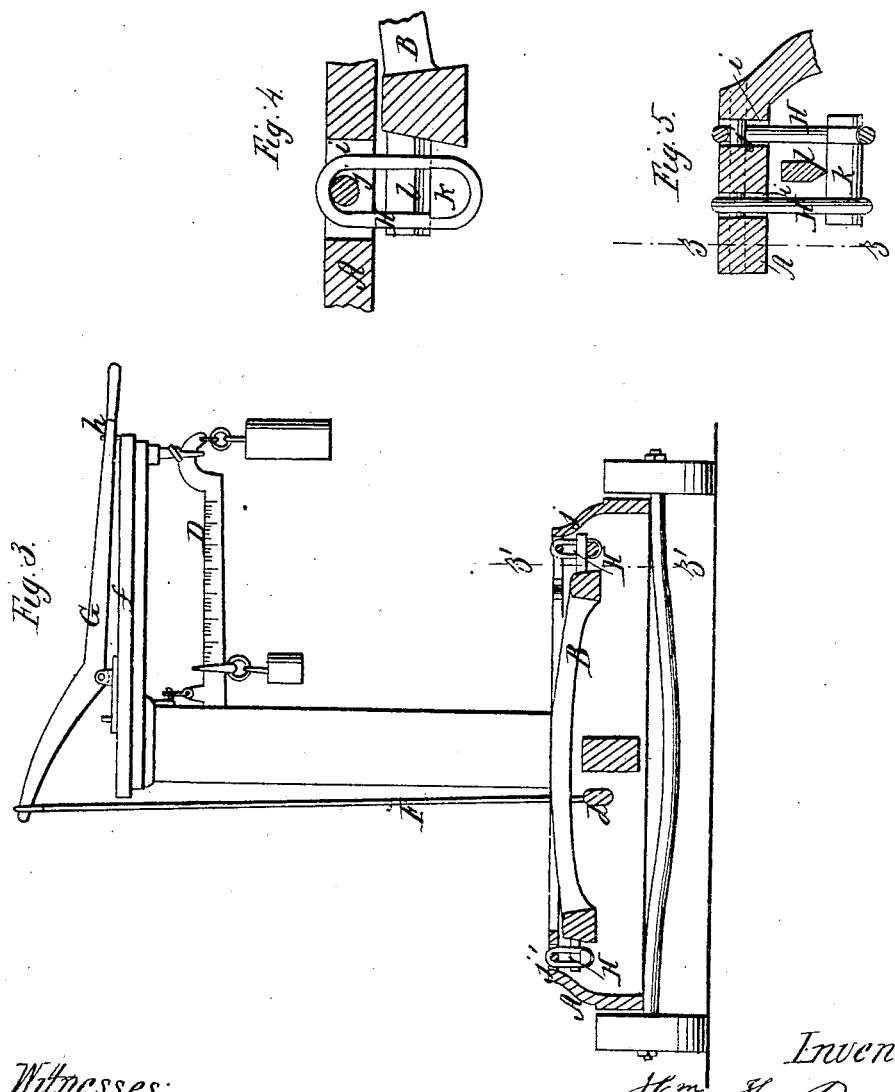
Witnesses:
Theo Tasche
Wm Freurn
Inventor:
Wm W Reynolds
Per Munn & Co
Attorneys

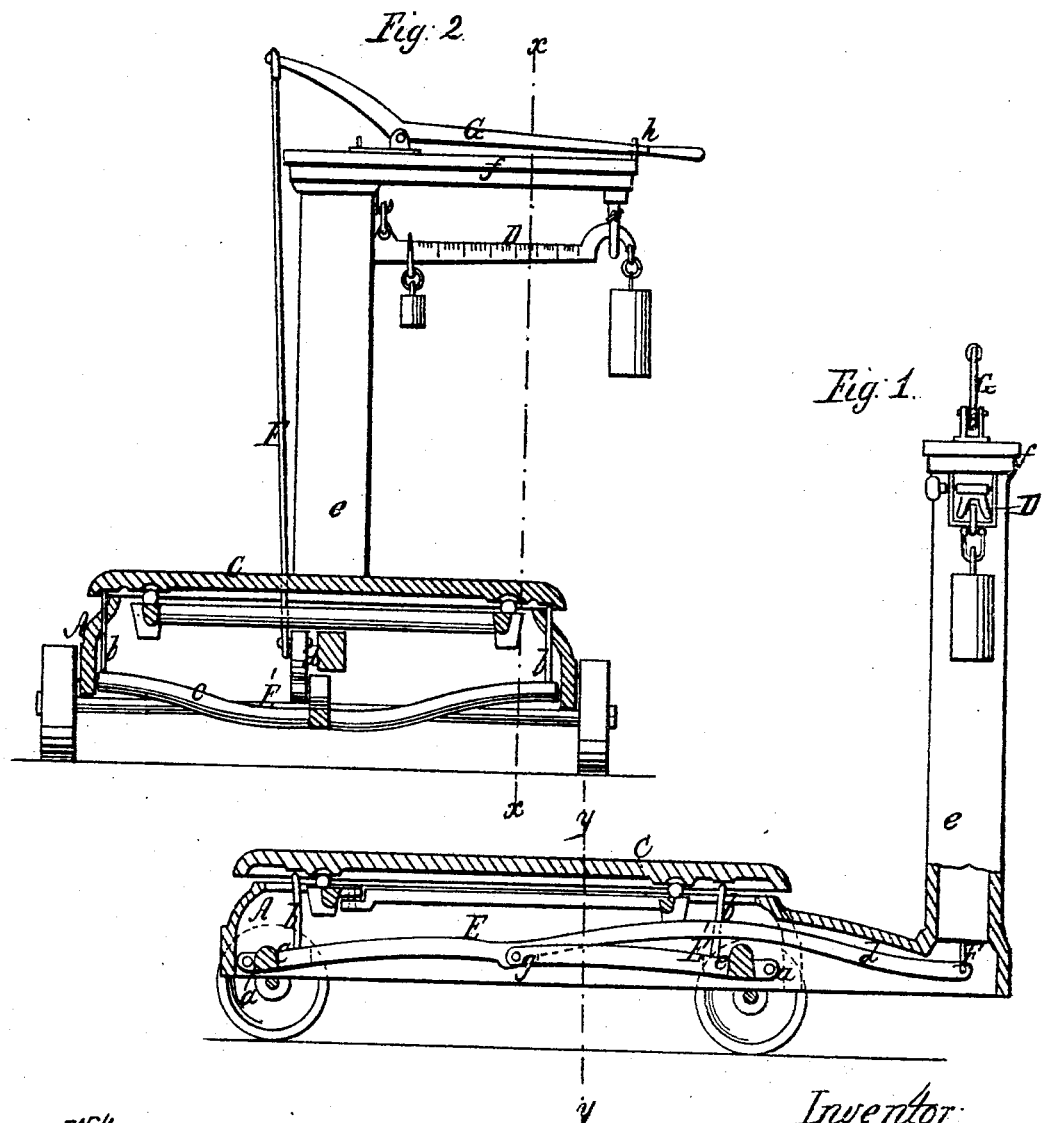

United States Patent Office.

WILLIAM W. REYNOLDS, OF BRANDON, VERMONT, ASSIGNOR TO HOWE SCALE COMPANY.

*Letters Patent No. 67,908, dated August 20, 1867.*

---

IMPROVED PLATFORM-SCALE.

---

*The Schedule referred to in these Letters Patent and making part of the same*

---

TO ALL WHOM IT MAY CONCERN:

Be it known that I, WILLIAM W. REYNOLDS, of Brandon, in the county of Rutland, and State of Vermont, have invented a new and useful improvement in Platform-Scales; and I do hereby declare that the following is a full, clear, and exact description thereof, which will enable others skilled in the art to make and use the same, reference being had to the accompanying drawings, forming part of this specification.

This invention relates to a new and useful improvement in that class of platform-scales which are provided with means for relieving the levers or weighing mechanism from the platform when the articles to be weighed are placed upon, and, after being weighed, taken off therefrom. This result is at present effected by having the weighing mechanism arranged in such a manner that it may, when it is necessary to detach or disconnect it from the platform, be lowered, so that the latter will rest on the frame or bed of the scales, and hence scales of this class are commonly termed "platform drop-scales."

My invention consists in accomplishing the object by having supports connected with lever attachments, and arranged in such a manner that the supports, when it is necessary to relieve the weighing mechanism from the platform, may be raised, so that the platform will rest upon them, leaving the weighing mechanism intact. By this means scales of this class are simplified in construction, rendered less liable to get out of repair, while all the advantages of the original plan are retained.

My invention further consists in a novel and improved manner of hanging or suspending the levers of the weighing mechanism, whereby a more secure connection of the suspended links and levers is obtained, and a proper position of the links always preserved. In the accompanying drawings—

Figure 1, Sheet No. 1, is a longitudinal vertical section of platform-scales, showing one feature of my invention, taken in the line $x\ x$, fig. 2.

Figure 2, a transverse vertical section of the same, taken in the line $y\ y$, fig. 1.

Figure 3, Sheet No. 2, is also a transverse vertical section of the same, taken in the same line $y\ y$ as fig. 2, but showing another feature of my invention.

Figure 4, a vertical section of fig. 5, taken in the line $z\ z$, fig. 5.

Figure 5, a vertical section of a portion of fig. 3, taken in the line $z'\ z'$, fig. 3.

Similar letters of reference indicate like parts.

A represents the bed or framing of the scales, in which the usual levers B are placed for the platform C to rest upon when the scales are in use, or articles are being weighed. D is the scale-beam connected by a rod to the levers B. These parts are in common use, well known, and therefore do not require a minute description. Within the bed or framing A there are placed, besides the weighing levers above referred to, two T-shaped levers E E', the ends of which work freely on pins $a$, (see fig. 1,) and to each of these levers upright pins or rods $b$ are attached, which pass up through the sides of the bed or framing A. There are two pins or rods $b$ on each lever E E', one at each end of the cross portions $c$, and the longitudinal part $d$ of the lever E is sufficiently long to extend into the lower part of the vertical trunk $e$, in which the rod is placed that forms a connection between the scale-beam and the weighing levers. To the outer end of the part $d$ of the lever E there is connected a rod, F, which extends upward by the side of the trunk $e$, and is attached to a lever, G, on a horizontal bar, $f$, on the top of the trunk. By actuating this lever G, depressing its long arm, the longitudinal part $d$ of the lever E will be raised, and both levers E E' actuated as the longitudinal arms or parts of both are connected, as shown at $g$, fig. 1, and the pins or rods $b$ will be moved upward against the platform C, so that the latter will not rest upon the weighing mechanism, as will be fully understood by referring to figs. 1 and 2. The lever G may have its long arm held or secured in a downward position by shoving it under a hook, $h$, on the bar $f$, as shown clearly in figs. 2 and 3. Thus by this simple means the weighing mechanism may be entirely relieved from the platform without disturbing or moving the former, which has hitherto been done. The weighing levers B of platform-scales have hitherto been suspended by links arranged in such a manner as to be liable to derangement, the links being liable to slip off from the pins, and the studs through which the pins pass liable to turn in the bed or frame of the scales. This difficulty I fully obviate by having the links H, on which the weighing levers B are suspended, fitted in slots $i$ in the bed or framing A, and resting on pins $j$, as shown in figs. 4 and 5, bearings *k* being placed in the lower parts of the links for knife-edges *l*, which project from the levers B, to rest upon. By this simple arrangement the links H will always be retained in proper position, and at the same time a free swinging movement allowed the weighing mechanism.

Having thus described my invention, I claim as new, and desire to secure by Letters Patent—

The arrangement of the links H, as shown and described, to wit, having the links fitted in slots *i* in the bed or framing A. and resting on pins *j*, as shown in figs. 3, 4, and 5 of the drawings.

WM. W. REYNOLDS.

Witnesses:
  E. June,
  Jno. Howe, Jr.